United States Patent
Ruxton

(10) Patent No.: US 10,291,742 B2
(45) Date of Patent: May 14, 2019

(54) DAMAGE SENSORS FOR A MOBILE COMPUTING DEVICE

(71) Applicant: GOOGLE LLC, Mountain View, CA (US)

(72) Inventor: Adam Ruxton, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 256 days.

(21) Appl. No.: 15/201,173

(22) Filed: Jul. 1, 2016

(65) Prior Publication Data

US 2018/0007164 A1     Jan. 4, 2018

(51) Int. Cl.
| | | |
|---|---|---|
| G06F 11/07 | (2006.01) | |
| G06F 11/30 | (2006.01) | |
| H04L 12/26 | (2006.01) | |
| H04L 29/08 | (2006.01) | |

(52) U.S. Cl.
CPC .......... *H04L 67/32* (2013.01); *G06F 11/0748* (2013.01); *G06F 11/0766* (2013.01); *G06F 11/3013* (2013.01); *G06F 11/3058* (2013.01); *H04L 43/10* (2013.01)

(58) Field of Classification Search
CPC ...... H04L 67/32; H04L 43/10; G06F 11/0748; G06F 11/0766; G06F 11/3013; G06F 11/3058
USPC ........................................................ 709/219
See application file for complete search history.

(56) References Cited

U.S. PATENT DOCUMENTS

| | | | |
|---|---|---|---|
| 4,829,163 A | 5/1989 | Rausch et al. | |
| 6,574,754 B1 | 6/2003 | Smith | |
| 8,044,818 B2 * | 10/2011 | Tysowski | G08B 21/24 340/540 |

(Continued)

FOREIGN PATENT DOCUMENTS

| | | |
|---|---|---|
| CN | 103150244 A | 6/2013 |
| CN | 103561171 A | 2/2014 |
| CN | 103873694 A | 6/2014 |

OTHER PUBLICATIONS

First Office Action, and translation thereof, from counterpart Chinese Application No. 201720798133.7, dated Dec. 19, 2017, 4 pp.

(Continued)

Primary Examiner — Davoud A Zand
(74) Attorney, Agent, or Firm — Morris & Kamlay LLP

(57) ABSTRACT

In general, this disclosure is directed to techniques for utilizing sensors within a computing device to detect a hazardous event and notify a central server that the computing device is potentially damaged. One or more sensors of a computing device may detect the hazardous event to the computing device. Responsive to detecting the hazardous event, the sensors may measure a magnitude of a damage measurand associated with the hazardous event to the computing device. The computing device may determine that the magnitude of the damage measurand exceeds a threshold damage value for the computing device. Responsive to determining that the magnitude of the damage measurand exceeds the threshold damage value, the computing device may send, to a server device, a message indicating the computing device is potentially damaged.

16 Claims, 4 Drawing Sheets

(56) References Cited

U.S. PATENT DOCUMENTS

| | | | |
|---|---|---|---|
| 8,988,232 | B1 | 3/2015 | Sloo et al. |
| 9,084,937 | B2 | 7/2015 | Gadher et al. |
| 9,947,051 | B1* | 4/2018 | Allen .................... G06Q 40/08 |
| 9,966,755 | B2* | 5/2018 | Parekh .................... G06F 21/81 |
| 2006/0287972 | A1 | 12/2006 | Kelso et al. |
| 2009/0309745 | A1* | 12/2009 | Johnson .................... G06F 1/26 340/635 |
| 2010/0188243 | A1 | 7/2010 | Tysowski et al. |
| 2012/0126975 | A1* | 5/2012 | Gonzales ............... G08B 29/20 340/540 |
| 2013/0033377 | A1 | 2/2013 | Hoseit |
| 2013/0138715 | A1 | 5/2013 | Petersen |
| 2013/0190095 | A1 | 7/2013 | Gadher et al. |
| 2013/0257582 | A1 | 10/2013 | Rothkopf et al. |
| 2014/0019449 | A1* | 1/2014 | Stimm ................ G06F 17/3061 707/736 |
| 2014/0091937 | A1 | 4/2014 | Pratt et al. |
| 2015/0310720 | A1* | 10/2015 | Gettings ............... G06F 16/113 340/540 |
| 2017/0045915 | A1 | 2/2017 | Pope et al. |
| 2018/0068392 | A1* | 3/2018 | Bowes .................... H04W 4/24 |

OTHER PUBLICATIONS

Combined Search and Examination Report from counterpart Great Britain Application No. 1710313.6, dated Nov. 27, 2017, 7 pp.
International Search Report and Written Opinion of International Application No. PCT/US2017/040334, dated Oct. 20, 2017, 19 pp.
Response to Written Opinion dated Oct. 20, 2017, from International Application No. PCT/US2017/040334, filed Apr. 26, 2018, 21 pp.
Campbell, "Future iPhones might notify users when their coverglass cracks", Apple Insider, Feb. 16, 2017, Retrieved from http://appleinsider.com/articles/17/02/16/future-iphones-might-notify-users-of-cracks-in-coverglass, 9 pgs.
International Preliminary Report on Patentability from International Application No. PCT/US2017/040334, dated Oct. 10, 2018, 4 pp.
First Communication, translation only, from counterpart German Application No. 102017114355.6, dated Jun. 27, 2018, 10 pp.
Response to Examination Report dated Nov. 27, 2017, from United Kingdom Application No. 2553207, filed Jun. 26, 2018, 13 pp.
Second Written Opinion of International Application No. PCT/US2017/040334, dated Jul. 3, 2018, 4 pp.

* cited by examiner

DAMAGE SENSORS FOR A MOBILE COMPUTING DEVICE

BACKGROUND

People use smartphone, tablet computer, smartwatch, and other mobile computing device technology more commonly during everyday activities. People are also damaging such devices more often. Furthering this issue, as manufacturers have increased the responsiveness of touchscreens and other input components, the manufacturers have also increased the fragility of these components. As repairing these devices may be a costly and complicated process, users may simply attempt to continue using the device if the touchscreen or other minor components are damaged. The continuing use of broken devices may decrease the user's satisfaction with the device and make the user less likely to purchase a device from that particular manufacturer in the future. The manufacturer may be unable to rectify this issue, as the manufacturer remains generally unaware that a singular device may be experiencing such issues.

SUMMARY

In one example, a method may include detecting, by one or more sensors of a computing device, a hazardous event to the computing device, responsive to detecting the hazardous event, measuring, by the one or more sensors of the computing device, a magnitude of a damage measurand associated with the hazardous event to the computing device, determining, by the computing device, that the magnitude of the damage measurand exceeds a threshold damage value for the computing device, and, responsive to determining that the magnitude of the damage measurand exceeds the threshold damage value, sending, by the computing device and to a server device, a message indicating the computing device is potentially damaged.

In another example, a computing device may include one or more sensors configured to detect a hazardous event to the computing device and, responsive to detecting the hazardous event, measure a magnitude of a damage measurand associated with the potentially damaging event. The computing device may also include at least one processor and at least one non-transitory computer-readable storage medium storing instructions that are executable by the at least one processor to determine that the magnitude of the damage measurand exceeds a threshold damage value for the computing device and, responsive to determining that the magnitude of the damage measurand exceeds the threshold damage value, send, to a server device, a message indicating the computing device is potentially damaged.

In another example, a non-transitory computer-readable storage medium includes encoded instructions that, when executed, cause at least one processor of a computing device to detect, using one or more sensors of the computing device, a hazardous event to the computing device, responsive to detecting the hazardous event, measure, using the one or more sensors of the computing device, a magnitude of a damage measurand associated with the potentially damaging event, determine that the magnitude of the damage measurand exceeds a threshold damage value for the computing device, and responsive to determining that the magnitude of the damage measurand exceeds the threshold damage value, send, to a server device, a message indicating the computing device is potentially damaged.

The details of one or more examples of the disclosure are set forth in the accompanying drawings and the description below. Other features, objects, and advantages of the disclosure will be apparent from the description and drawings, and from the claims.

DETAILED DESCRIPTION

In general, this disclosure describes techniques for detecting an event that may damage a computing device and automatically notifying a remote computing system that the computing device may be damaged. For instance, if sensors within the computing device detect a forceful impact, such as from being dropped onto a hard surface, the sensors within the computing device may measure the force of the impact on the computing device. If the sensors determine that the detected force exceeds a value at which the screen of the device is likely to have cracked, then the computing device may notify a central server that the computing device suffered a potentially damaging impact. Similarly, the sensors may detect smoke or water within the computing device and determine potential damage based on the detected smoke or water within the device.

By detecting when the computing device is potentially damaged, the computing device may provide the user of the device with requisite information to assist the user in repairing the device. This may lead to an expedited repair process for the user and an increase in customer satisfaction. Further, by notifying a central server that the computing device is potentially damaged, the manufacturer of the device may assist the user in repairing or replacing the potentially damaged computing device. This service may be especially helpful for detecting damage that results in internal smoke or water damage, which may not be immediately discernable to a user but may still be harmful to the device and may decrease the responsiveness of various components within the computing device.

Figure 1:
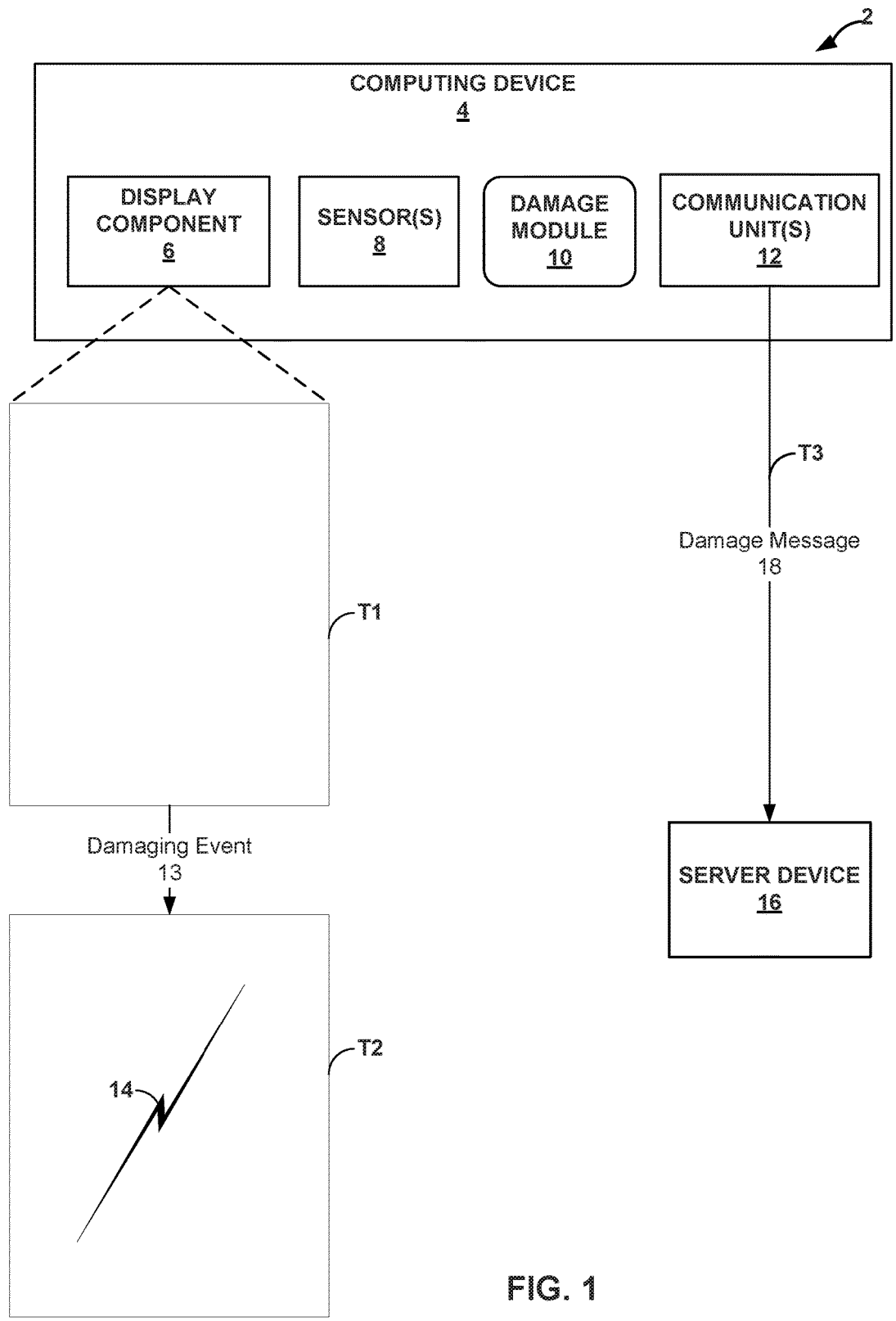
FIG. 1 is a conceptual diagram illustrating an example computing device configured to detect potentially damaging events and notify a remote computing system of the occurrence of the event, in accordance with one or more aspects of the present disclosure.

FIG. 1 is a conceptual diagram illustrating an example computing device that monitors potentially damaging events and notifies a server upon the occurrence of a potentially damaging event, in accordance with one or more aspects of the present disclosure. As further described below, based at least in part on a measured magnitude of a damage measurand resulting from a hazardous event detected by sensors 8, computing device 4 may determine that computing device 4 is potentially damaged.

As shown in FIG. 1, system 2 includes computing device 4. In the example of FIG. 1, computing device 4 is described as a mobile telephone. However, in some examples, computing device 4 may be a computerized watch (e.g., a smartwatch), computerized eyewear, computerized headwear, other types of wearable computing devices, a tablet computer, a personal digital assistant (PDA), a laptop computer, a gaming system, a media player, an e-book reader, a television platform, an automobile navigation system, a digital camera, or any other type of mobile and/or non-mobile computing device.

In the example shown in FIG. 1, computing device 4 includes display component 6, one or more sensors 8, damage module 10, and one or more communication units 12. Damage module 10 may perform operations described herein using software, hardware, firmware, or a mixture of hardware, software, and/or firmware residing in and/or executing at computing device 4. Computing device 4 may execute damage module 10 with one or more processors. In some examples, computing device 4 may execute damage module 10 as one or more virtual machines executing on underlying hardware of computing device 4. Damage module 10 may execute as one or more services or components of operating systems or computing platforms of computing device 4. Damage module 10 may execute as one or more executable programs at application layers of computing platforms of computing device 4 with operating system privileges or with access to a runtime library of computing device 4. In some examples, display component 6, sensors 8, damage module 10, and communication units 12 may be arranged remotely to and be remotely accessible to computing device 4, for instance, via interaction by computing device 4 with one or more remote network devices.

Display component 6 of computing device 4 may include respective input and/or output components for computing device 4. In some examples, display component 6 may function as input component using a presence-sensitive input component, such as a resistive touchscreen, a surface acoustic wave touchscreen, a capacitive touchscreen, a projective capacitance touchscreen, a pressure sensitive screen, an acoustic pulse recognition touchscreen, or another display component technology. Display component 6 may also include a display component that can output content in a graphical user interface in accordance with one or more techniques of the current disclosure, such as a liquid device crystal display (LCD), a dot matrix display, a light emitting diode (LED) display, an organic light-emitting diode (OLED) display, e-ink, or similar monochrome or color displays capable of outputting visible information to a user of computing device 4.

In some examples, the presence-sensitive input component of display component 6 receives tactile input from a user of computing device 4. The presence-sensitive input component of display component 6 may receive indications of tactile input by detecting one or more gestures from a user (e.g., the user touching or pointing to one or more locations of display component 6 with a finger or a stylus pen). Display component 6 may present output to a user, such as a graphical user interface (e.g., a user interface for viewing an alert based on notification data), which may be associated with functionality provided by computing device 4. For example, display component 6 may present various user interfaces related to the functionality of computing platforms, operating systems, applications, and/or services executing at or accessible by computing device 4 (e.g., notification services, electronic message applications, Internet browser applications, mobile or desktop operating systems, etc.). A user may interact with a user interface presented at display component 6 to cause computing device 4 to perform operations relating to functionality of computing device 4, an application executing on computing device 4, or an operating system of computing device 4.

In the example of FIG. 1, computing device may include one or more sensors 8. One or more of sensors 8 may measure one more measurands. Examples of one or more of sensors 8 may include one or more position sensors (e.g., a global positioning system (GPS) sensor, an indoor positioning sensor, or the like), one or more motion/orientation sensors (e.g., an accelerometer, a gyroscope, or the like), a light sensor, a temperature sensor, a pressure (or grip) sensor, a physical switch, a proximity sensor, a force sensor, a water sensor, a smoke sensor, and one or more bio-sensors that can measure properties of the skin/blood, such as alcohol, blood sugar etc.

Computing device 4, in some examples, also includes one or more communication units 12. Computing device 4, in one example, utilizes communication unit 12 to communicate with external devices via one or more networks, such as one or more wired or wireless networks. Communication unit 12 may be a network interface card, such as an Ethernet card, an optical transceiver, a radio frequency transceiver, or any other type of device that can send and receive information. Examples of such network interfaces may include Bluetooth, infrared signaling, 3G, LTE, and Wi-Fi radios as well as Universal Serial Bus (USB) and Ethernet. In some examples, computing device 4 utilizes communication unit 12 to wirelessly communicate with another computing device that is operably coupled to computing device 4.

In accordance with techniques of this disclosure, computing device 4 is configured to automatically detect potentially damage-inducing events and report such events to a remote computing system. At time T1, computing device 4 may be fully intact. Computing device 4 may be a fully functioning computing device, such as a mobile telephone. That is, computing device 4 may be fully operational (i.e., capable of performing all of the operations computing device 4 is designed or configured to perform) at time T1. In other examples, at time T1, computing device 4 may be less than fully operational or damaged, but still operational such that sensors 8 and damage module 10 may still be capable of performing the techniques described herein.

At time T2, computing device 4 may experience damaging event 13. For instance, damaging event 13 may include a user dropping computing device 4 into a body of water, an internal component of computing device 4 producing smoke, a drop onto a solid surface, etc. In the example of FIG. 1, damaging event 13 may consist of the user dropping computing device 4 onto a hard surface from an unsafe height. For instance, the user may have dropped computing device 4 off of a stoop of a home and onto pavement. Damaging event 13 may cause damage 14. In the instance of FIG. 1, damage 14 includes a crack in display component 6.

Sensors 8 of computing device 4 may detect that a hazardous event to computing device 4 has occurred. In the example of FIG. 1, sensors 8 may detect a sharp change in acceleration acting upon computing device 4. In such instances, damage module 10 may use this data to determine that the hazardous event may be an impact resulting from the drop of damaging event 13 at time T2. In other instances, sensors 8 may detect smoke or water inside of computing device 4. In such instances, responsive to sensors 8 detecting smoke or water inside of computing device 4, damage module 10 may use this data to determine whether computing device 4 is potentially damaged. In general, the hazardous event may be any physical or chemical damage inflicted upon computing device 4 that may be measured by sensors 8.

Responsive to detecting the hazardous event, sensors 8 may measure a magnitude of a damage measurand associated with the hazardous event to the computing device 4. As described above, in the example of FIG. 1, sensors 8 may detect a sharp change in acceleration acting upon computing device 4, leading to damage module 10 determining that the hazardous event may be an impact on computing device 4. Responsive to detecting such a change in acceleration, sensors 8 may measure the magnitude of the damage measurand as an amplitude or a force of the impact.

Damage module 10 may determine whether the magnitude of the damage measurand exceeds a threshold damage value for one or more components of computing device 4. For instance, computing device 4 may store a threshold damage value that corresponds to a maximum event severity that computing device 4 may endure before typically sustaining damage. In other words, if sensors 8 detect an impact that exceeds a certain threshold damage value, damage module 10 may determine that computing device 4, or a particular component of computing device 4, may be damaged. In the example of FIG. 1, display component 6 may be capable of enduring a certain force or a certain amplitude of impact before display component 6 is reasonably expected to chip or crack. This force may be dependent on the frame of computing device 4 and the material used for display component 6. For instance, some materials may be capable of withstanding up to 100 pounds of force. The stored force may be less than the maximum for the particular material, however, as small scratches and general wear can reduce the strength of the screens over time. For instance, the stored force may equal 30 pounds. In other instances, the stored force may equal a percentage of the maximum force. Computing device 4 may store this force or amplitude of impact as the threshold damage value, where, if sensors 8 detect an impact that exceeds this threshold damage value, damage module 10 may determine that computing device 4, or display component 6, is potentially damaged.

Responsive to determining that the magnitude of the damage measurand exceeds the threshold damage value for computing device 4, damage module 10 may send, using communication unit 12, damage message 18 to central server 16 at time T3. Damage message 18 may indicate that computing device 4 is potentially damaged. In the example of FIG. 1, damage module 10 may determine that the magnitude of the damage measurand of the force or amplitude of the impact measured by sensors 8 exceeds the threshold damage value that display component 6 may be capable of enduring before display component 6 is reasonably expected to chip or crack. Responsive to making this determination, damage module 10 may notify central server 16 that computing device 4 is potentially damaged by sending damage message 18 to central server 16. Central server 16 may be owned and operated by a manufacturer of computing device 4 so that the manufacturer is aware of the potential damage to computing device 4.

Computing device 4 may or may not actually be damaged upon the occurrence of the hazardous event of dropping computing device 4 onto the hard surface. Damage module 10 may determine that computing device 4 is potentially damaged in response to determining that the magnitude of the force resulting from the drop satisfies the threshold force value. In instances where computing device 4 determines that computing device 4 is potentially damaged, computing device 4 may send damage message 18 to central server 16 based on the potential of computing device 4 being damaged rather than a conclusive determination that computing device 4 is actually damaged.

By sending damage message 18 to central server 16 in response to damage module 10 determining that the measured magnitude of the damage measurand satisfies the threshold damage value, computing device 4 may notify the manufacturer of computing device 4 that computing device 4 is potentially damaged. The user may receive the requisite information to assist the user in repairing computing device 4. This may lead to an expedited repair process for the user and an increase in customer satisfaction. Such a service may be especially helpful for detecting damage that results in internal smoke or water damage, which may not be immediately discernable to a user but may still be harmful to the device and worsen the user experience for computing device 4.

Further to the descriptions above, a user may be provided with controls allowing the user to make an election as to both if and when sensors, systems, programs or features described herein may enable collection of user information (e.g., sensor information, a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
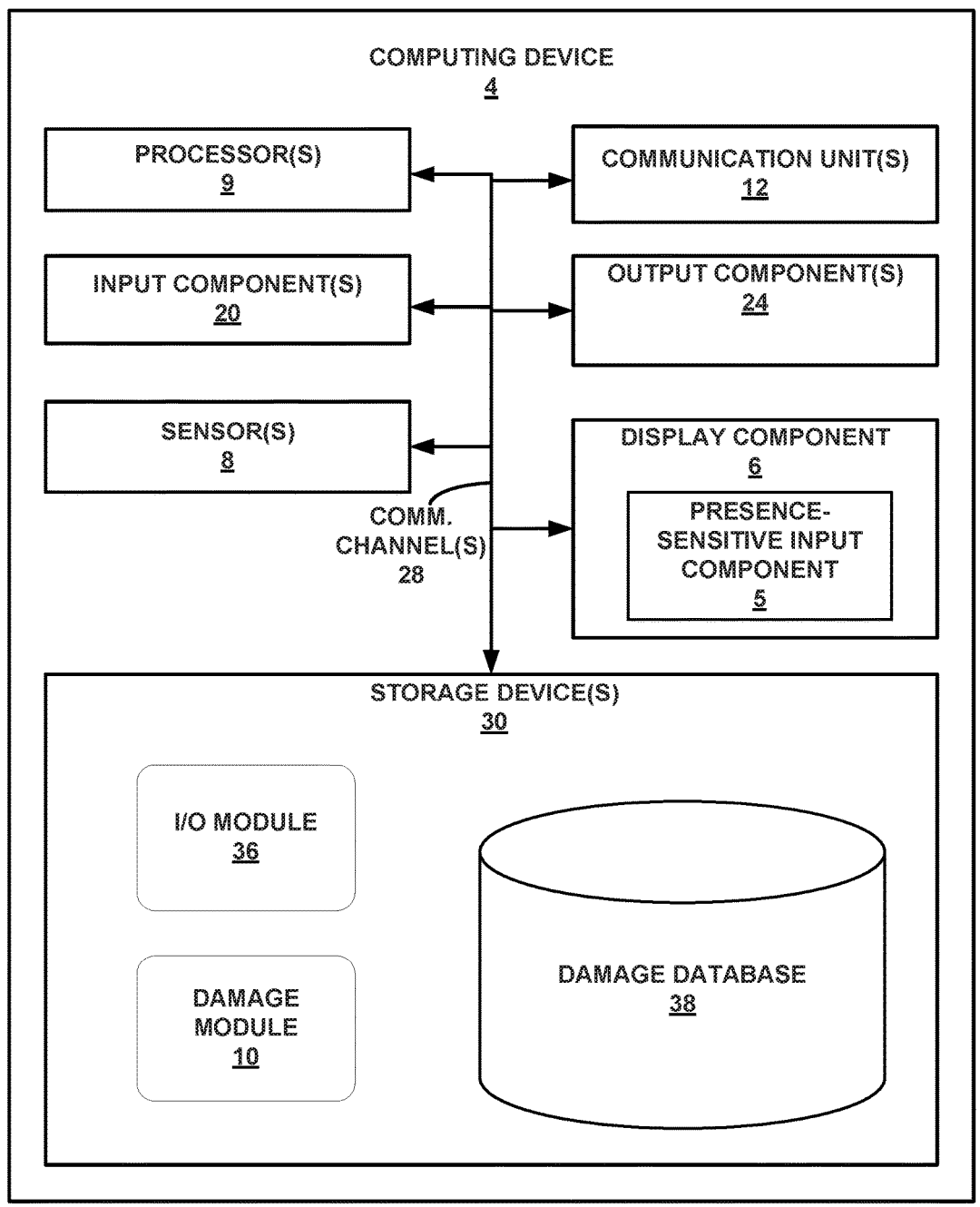
FIG. 2 is a block diagram illustrating an example computing device configured to detect potentially damaging events, in accordance with one or more aspects of the present disclosure.

FIG. 2 is a block diagram illustrating further details of the example computing device of FIG. 1, in accordance with one or more aspects of the present disclosure. FIG. 2 illustrates only one particular example of computing device 4, and many other examples of computing device 4 may be used in other instances.

As shown in the specific example of FIG. 2, computing device 4 includes one or more processors 9, one or more input components 20, one or more communication units 12, one or more output components 24, one or more storage devices 30, one or more sensors 8, display component 6, and presence-sensitive input component 5. Storage device 30 of computing device 4, in the example of FIG. 2, includes damage module 10, I/O module 36, and damage database 38. Each of components 5, 6, 8, 9, 12, 20, 24, and 30 may be interconnected (physically, communicatively, and/or operatively) for inter-component communications. In some examples, communication channels 28 may include a system bus, network connection, inter-process communication data structure, or any other channel for communicating data. As shown in FIG. 2, components 5, 6, 8, 9, 12, 20, 24, and 30 may be coupled by one or more communication channels 28. Damage module 10, I/O module 36, and damage database 38 may also communicate information with one another as well as with other components in computing device 4.

Processors 9, in one example, are configured to implement functionality and/or process instructions for execution within computing device 4. For example, processors 9 may be capable of executing instructions stored in storage device 30. Examples of processors 9 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 30 may be configured to store information within computing device 4 during operation. Storage device 30, in some examples, is described as a computer-readable storage medium. In some examples, storage device 30 is a temporary memory, meaning that a primary purpose of storage device 30 is not long-term storage. Storage device 30, in some examples, is described as a volatile memory, meaning that storage device 30 does not maintain stored contents when the computing device is turned off. Examples of volatile memories include random access memories (RAM), dynamic random access memories (DRAM), static random access memories (SRAM), and other forms of volatile memories known in the art. In some examples, storage device 30 is used to store program instructions for execution by processors 9. Storage device 30, in one example, is used by damage module 10 to temporarily store information during the execution of techniques described herein.

Storage devices 30, in some examples, also include one or more computer-readable storage media. Storage devices 30 may be configured to store larger amounts of information than volatile memory. Storage devices 30 may further be configured for long-term storage of information. In some examples, storage devices 30 include non-volatile storage elements. Examples of such non-volatile storage elements include magnetic hard discs, optical discs, floppy discs, flash memories, or forms of electrically programmable memories (EPROM) or electrically erasable and programmable (EE-PROM) memories.

An example of data that storage device 30 may store for reference in the execution of the techniques of this disclosure includes damage database 38. Damage database 38 may store reference characteristics for computing device 4, such as various damage threshold values. For instance, damage database 38 may store a threshold volume of water, a threshold volume of smoke, and/or a threshold force of impact where, if sensors 8 measure a magnitude of a damage measurand that is greater than or equal to the damage threshold value, damage module 10 may determine that computing device 4 is potentially damaged.

Computing device 4, in one example, also includes one or more input components 20. Input component 20, in some examples, is configured to receive input from a user through tactile, audio, or video feedback. Examples of input component 20 include a display component, a mouse, a keyboard, a camera, a microphone or any other type of device for detecting input from a user.

One or more output components 24 may also be included in computing device 4. Output component 24, in some examples, is configured to provide output to a user using tactile, audio, or video stimuli. Output component 24, in one example, includes an electronic display, a loudspeaker, or any other type of device for converting a signal into an appropriate form understandable to humans or machines. The electronic display may be an LCD or OLED part of a touch screen, may be a non-touchscreen direct view display component such as a CRT, LED, LCD, or OLED. The display component may also be a projector instead of a direct view display.

In some examples, display component 6 may include functionality of input component 20 and/or output component 24. In the example of FIG. 2, display component 6 may be configured to output graphical content on the display and receive indications of user input via presence-sensitive input component 5. In some examples, presence-sensitive input component 5 may detect an object at and/or near the screen of the display component. As one example range, presence-sensitive input component 5 may detect an object, such as a finger or stylus that is within 2 inches (~5.08 centimeters) or less of the physical screen of display component 6. Presence-sensitive input component 5 may determine a location (e.g., an (x,y) coordinate) of display component 6 at which the object was detected. In another example range, presence-sensitive input component 5 may detect an object 6 inches (~15.24 centimeters) or less from the physical screen of display component 6 and other exemplary ranges are also possible. Presence-sensitive input component 5 may determine the location of the display selected by a user's finger using capacitive, inductive, and/or optical recognition techniques. In some examples, presence-sensitive input component 5 provides output to a user using tactile, audio, or video stimuli as described with respect to output component 24.

One or more components of storage devices 30 including damage module 10, I/O module 36, and damage database 38 may each include program instructions and/or data that are executable by computing device 4. As one example, damage module 10 may include instructions that cause computing device 4 to perform one or more of the operations and actions described in the present disclosure. In some examples, one or more of the components illustrated in storage device 30 may be implemented in hardware and/or a combination of software and hardware.

I/O module 36 may receive and interpret inputs detected at display component 6 (e.g., as a user provides one or more gestures at one or more locations of display component 6 at which a user interface is displayed) and input detected at other input components of computing device 4 (e.g., microphones, cameras, sensors, physical buttons, etc.). I/O module 36 may relay information about the hazardous event detected at computing device 4 to one or more associated platforms, applications, and/or services executing at computing device 4, as well as platforms or devices executing separately from computing device 4, such as server device 16 of FIG. 1. For example, based on received input at sensors 8, I/O module 36 may initiate the techniques described herein.

I/O module 36 also may receive information and instructions from one or more associated platforms, applications, and/or services executing at computing device 4, as well as platforms or devices executing separately form computing device 4, such as server device 16. In addition, I/O module 36 may act as a respective intermediary between the one or more associated platforms, operating systems, applications, and/or services executing at computing device 4 and various output components of computing device 4 (e.g., display component 6, one or more sensors 26, storage devices 30, audio output component 7 (e.g., a speaker), an LED indicator, other output components, etc.) to produce output (e.g., a graphic, a flash of light, a sound, a somatosensory response, a haptic response, etc.) with computing device 4.

In accordance with techniques of this disclosure, computing device 4 is configured to automatically detect potentially damage-inducing events and report such events to a remote computing system. At a first time, computing device 4 may be partially damaged. In other words, computing device 4 may be less than fully operational or damaged, but still operational such that sensors 8 and damage module 10 may still be capable of performing the techniques described herein. For instance, computing device 4 may have scratches and dents to the casing, or an input port (e.g., a charging port) of computing device 4 may be non-functional.

At a second time, computing device 4 may experience a damaging event. For instance, the damaging event may include a user dropping computing device 4 into a body of water, an internal component of computing device 4 producing smoke, a drop onto a solid surface from an unsafe height, etc. In the example of FIG. 2, for illustration purposes, the damaging event may involve the user dropping computing device 4 into a puddle.

I/O module 36 may utilize sensors 8 of computing device 4 to detect that a hazardous event has occurred. In the example of FIG. 2, I/O module 36 may utilize sensors 8 to detect a presence of water inside computing device 4. In such instances, I/O module 36 may use this data to determine that the hazardous event may be possible water damage resulting from the drop of computing device 4 into the puddle. In other instances, sensors 8 may detect smoke inside of computing device 4 or a forceful impact to the body of computing device 4. In such instances, responsive to I/O module 36 utilizing sensors 8 to detect smoke inside of computing device 4 or the impact to the body of computing device 4, damage module 10 may use this data to determine whether computing device 4 is potentially damaged. In general, the hazardous event may be any physical or chemical damage inflicted upon computing device 4 that sensors 8 may measure using a damage measurand.

Responsive to detecting the hazardous event of computing device 4 being dropped into a puddle, damage module 10 may utilize sensors 8 to measure a magnitude of a damage measurand associated with the hazardous event to the computing device 4. As described above, I/O module 36 may utilize sensors 8 to detect a presence of water inside computing device 4 resulting from the dropping of computing device 4 into the puddle. Responsive to detecting the presence of water, sensors 8 may measure the magnitude of the damage measurand as a volume of the water within computing device 4. The damage measurand may be measured in one of Newtons (N), Joules (J), multiples of an acceleration of gravity (g), volts (V), light intensity (lx), volume (ml), or any other unit suitable to measure the specific measurand.

Damage module 10 may determine whether the magnitude of the damage measurand exceeds a threshold damage value for one or more components of computing device 4. For instance, computing device 4 may store a threshold damage value that corresponds to a maximum event severity that computing device 4 may endure before typically sustaining damage. Further, each type of damage may be associated with a different threshold damage value that is specific to the particular type of damage. In other words, if sensors 8 detect a volume of water that exceeds a certain threshold damage value, such as any volume of water capable of triggering a water-activated solid-state switch or a small conductive circuit, damage module 10 may determine that computing device 4, or a particular component of computing device 4, may be damaged. In the example of FIG. 2, communication channels 28 may be capable of enduring a certain volume of water before communication channels 28 are reasonably expected to short circuit or stop transmitting signals between internal components of computing device 4. Computing device 4 may store this volume of water as the threshold damage value in damage database 38, where, if sensors 8 detect a volume of water that exceeds this threshold damage value, damage module 10 may determine that computing device 4, or communication channels 28, is potentially damaged.

In determining that the magnitude of the damage measurand exceeds the threshold damage value, damage module 10 may first determine the threshold damage value. The threshold damage value may be a predetermined value above which a probability of the hazardous event damaging computing device 4 is greater than a threshold probability of the hazardous event damaging computing device 4. For instance, a user of computing device 4 or the manufacturer of computing device 4 may select a threshold probability, such as 50%, 75%, or 90%, among other probabilities. In such instances, a higher probability may be associated with a higher threshold damage value. In other words, a certain volume of water, volume of smoke, or force of impact may only have a 40% chance of damaging computing device 4. However, a larger volume of water, volume of smoke, or force of impact may have a larger chance of damaging computing device 4.

In other instances, a duration of the potentially damaging event may affect damage module 10's determination of potential damage. For instance, if sensors 8 detects a small presence of water for a long period of time (e.g., thirty minutes, an hour, a day, etc.), damage module 10 may be more likely to determine that the hazardous event of dropping computing device 4 into the puddle is potentially damaging. Similarly, if sensors 8 detects a presence of water for a very short period of time, followed by sensors 8 detecting no water at all within computing device 4, damage module 10 may be less likely to determine that the hazardous event of dropping computing device 4 into the puddle is potentially damaging.

The threshold damage value may be further based on a structural component of computing device 4. For instance, if communication channels 28 are insulated with Teflon, the threshold volume of water that communication channels 28 may reasonably withstand may be higher than if communication channels 28 are insulated with a silicone rubber. In another instance, if display component 6 is made of glass, the threshold force of impact that display component 6 may reasonably withstand before display component 6 is expected to chip or crack may be lower than if display component 6 is made of sapphire. Damage module 10 of computing device 4 may actively determine the threshold damage value, or damage database 38 may be pre-loaded by a manufacturer with the respective threshold values of damage.

Damage module 10 may further compare the magnitude of the damage measurand with the threshold damage value, as determined above. Damage module 10 may determine that the magnitude of the damage measurand (e.g., the volume of water, the amount of force detected, the amount of smoke, etc.) exceeds the threshold damage value in response to the magnitude of the damage measurand being greater than or equal to the threshold damage value.

Responsive to damage module 10 determining that the magnitude of the damage measurand exceeds the threshold damage value for computing device 4, I/O module 36 may send, using communication unit 12, a damage message to a central server. The damage message may indicate that computing device 4, or a component of computing device 4, is potentially damaged. Continuing the example of FIG. 2, damage module 10 may determine that the magnitude of the damage measurand of the volume of water inside computing device 4, as measured by sensors 8, exceeds the threshold damage value that communication channels 28 may be capable of enduring before communication channels 28 are reasonably expected to malfunction. Responsive to making this determination, I/O module 36 may notify the central server that computing device 4 (or communication channels 28) is potentially damaged by sending the damage message to the central server. The central server may be owned and operated by a manufacturer of computing device 4 so that the manufacturer is aware of the potential damage to computing device 4.

Responsive to sending the message to the server device, I/O module 36 may receive, via a user account associated with computing device 4, information about repairing the potentially damaged computing device 4. The user account may be an email account, a phone number, a social media account, or any other messaging service that computing device 4 or a separate computing device used by the user may utilize to communicate with the central server. By receiving the repair information through the user account associated with computing device 4, in some examples, the user of computing device 4 may access the repair information on a device separate from computing device 4. For instance, with the example of water damage, presence-sensitive input component 5 or display component 6 may become unresponsive due to the water damage. As such, while I/O module 36 may still function and be capable of receiving information from the central server, the user may not be able to access or utilize the received information. However, if the repair information is sent to an email address associated with computing device 4, the user may access the repair information on a separate computing device and utilize the repair information to fix the water damage.

Computing device 4 may or may not actually be damaged upon the occurrence of dropping computing device 4 into the puddle, as described above with relation to the hazardous event. Damage module 10 may merely determine that computing device 4 is potentially damaged based on sensors 8 detecting a volume of water resulting from the hazardous event that meets the threshold water volume. As such, computing device 4 may send the damage message to the central server based only on the potential of computing device 4 being damaged rather than a conclusive determination that computing device 4 is actually damaged.

Figure 3:
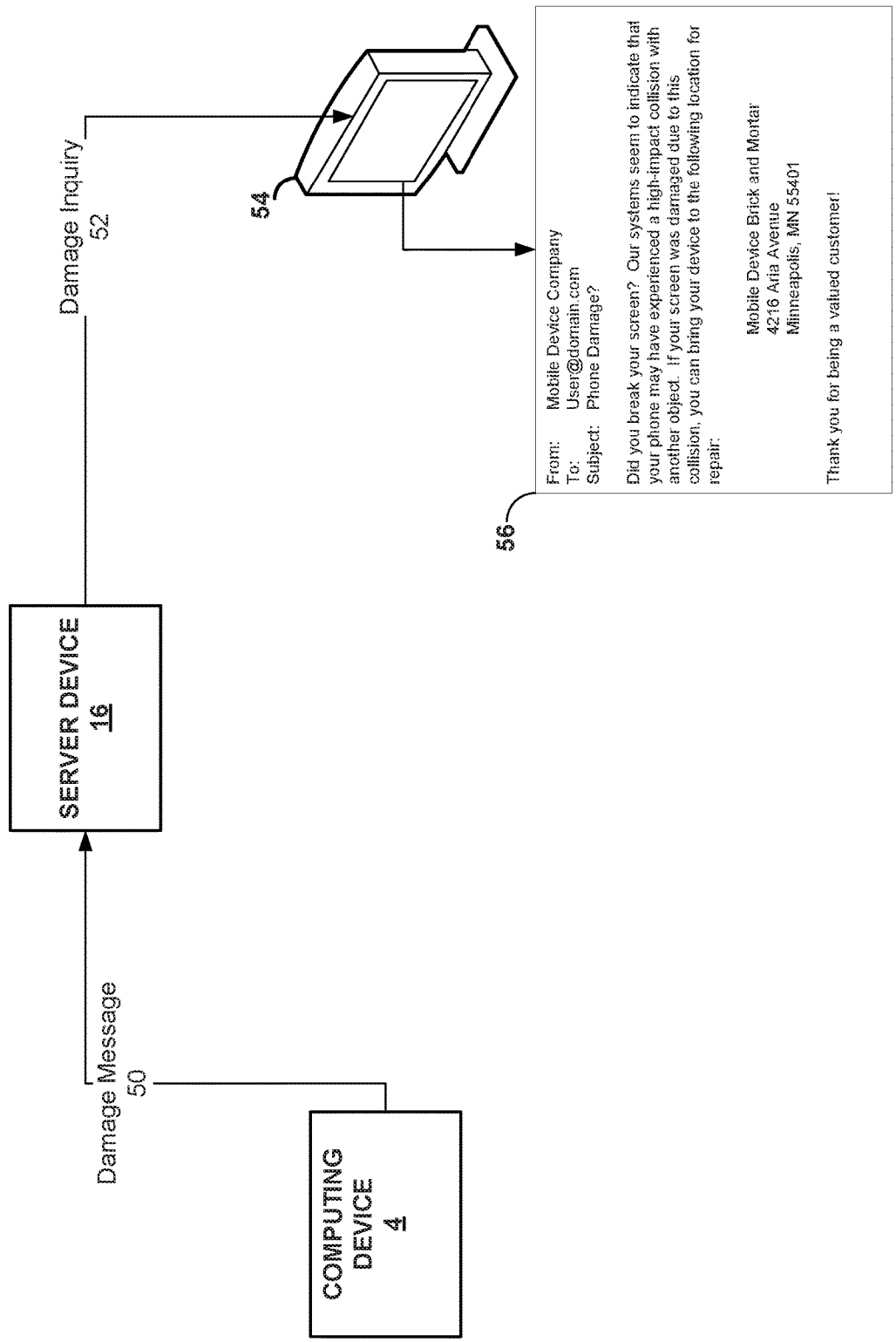
FIG. 3 is a conceptual diagram illustrating a message received at a second computing device after the first computing device is potentially damaged, in accordance with one or more aspects of the present disclosure.

FIG. 3 is a conceptual diagram illustrating a message received at a second computing device 54 after the first computing device 4 is potentially damaged, in accordance with one or more aspects of the present disclosure. The example shown in FIG. 3 includes a computing device 4, server device 16, and second computing device 54. Computing device 4 may me similar to computing device 4 of FIGS. 1 and 2, although computing device 4 may, generally, be any component or system that includes a processor or other suitable computing environment for executing software instructions. In the example of FIG. 3, computing device 54 is described as a desktop computer. However, in some examples, computing device 54 may be a computerized watch (e.g., a smartwatch), computerized eyewear, computerized headwear, other types of wearable computing devices, a tablet computer, a personal digital assistant (PDA), a laptop computer, a gaming system, a media player, an e-book reader, a television platform, an automobile navigation system, a digital camera, or any other type of mobile and/or non-mobile computing device that may access a user account associated with computing device 4 or the user of computing device 4.

In accordance with techniques of this disclosure, computing device 4 may be dropped onto a hard surface from an unsafe height. Sensors of computing device 4 may measure the force of the impact resulting from the drop, and computing device 4 may determine that the resulting force exceeds a threshold force that computing device 4 can withstand before it is probable that a display component of computing device 4 has cracked or chipped. As a result, computing device 4 may send damage message 50 to server device 16 that indicates computing device 4 (or the display component of computing device 4) is potentially damaged.

Responsive to sending damage message 50 to server device 16, server device 16 may send, to a user account associated with computing device 4, damage inquiry 52. Damage inquiry 52 may include a request to confirm whether computing device 4 is actually damaged and/or information about repairing the potentially damaged computing device 4. The user account may be an email account, a phone number, a social media account, or any other messaging service that computing device 4 or second computing device 52 may utilize to communicate with the central server. By sending the repair information to the user account associated with computing device 4, the user of computing device 4 may access the repair information on a device separate from computing device 4, such as computing device 54. For instance, with the example of a potentially cracked display component, a presence-sensitive input component or the display component may become unresponsive due to the cracks. Similarly, the display component may be unsafe to touch if the display component splinters or is sharp as a result of the cracks. As such, while computing device 4 may still function and be capable of receiving information from central server 16, the user may not be able to access or utilize damage inquiry 52. However, if damage inquiry 52 is sent to an email address associated with computing device 4, the user may access damage inquiry 52 on separate computing device 54 and utilize damage inquiry 52 to fix the cracked display component.

Figure 4:
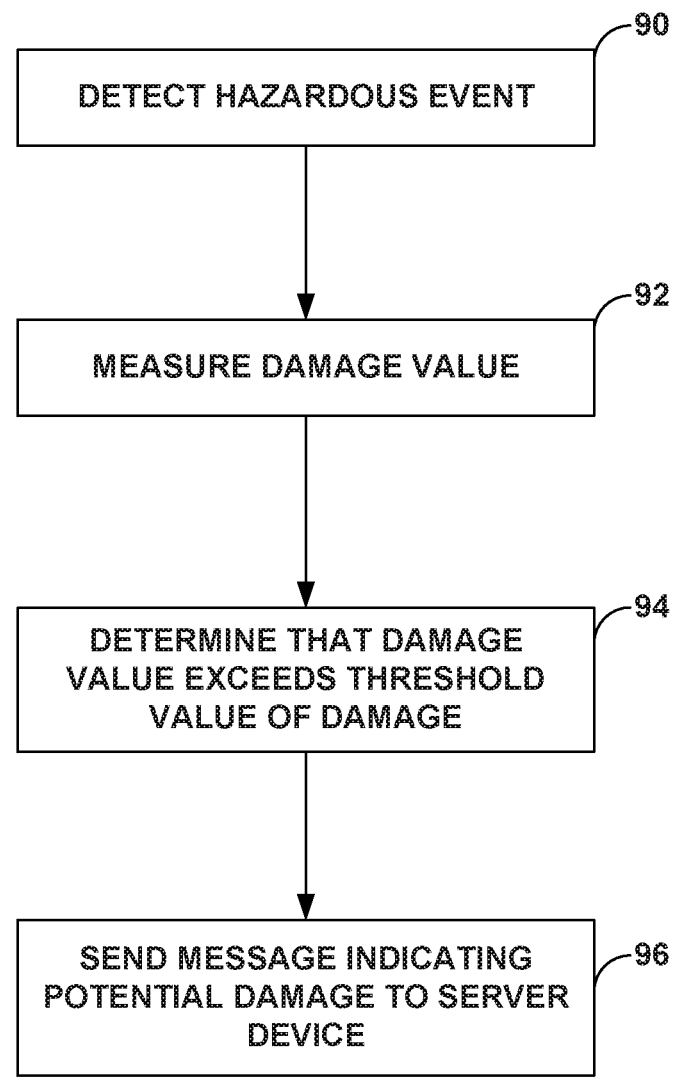
FIG. 4 is a flow diagram illustrating example operations of a computing device configured to detect potentially damaging events, in accordance with one or more aspects of the present disclosure.

FIG. 4 is a flow diagram illustrating example operations of a computing device that implements techniques for monitoring potentially damaging events, in accordance with one or more aspects of the present disclosure. The techniques of FIG. 4 may be performed by one or more processors of a computing device, such as computing device 4 illustrated in FIG. 1 and FIG. 2. For purposes of illustration, the techniques of FIG. 4 are described within the context of computing device 4 of FIG. 1, although computing devices having configurations different than that of computing device 4 may perform the techniques of FIG. 4. One or more of the steps described may be optional and not every step described/shown in the flow diagram of FIG. 4 is required to perform the techniques of this disclosure.

In accordance with techniques of this disclosure, computing device 4 is configured to automatically detect potentially damage-inducing events and report such events to a remote computing system. Computing device 4 may experience a damaging event. For instance, the damaging event may include a user dropping computing device 4 into a body of water, an internal component of computing device 4 producing smoke, a drop onto a solid surface from an unsafe height, etc. In the example of FIG. 4, for illustration purposes, the damaging event may involve an internal circuitry of computing device 4 short-circuiting and creating smoke.

Damage module 10 may utilize sensors 8 of computing device 4 to detect that a hazardous event to computing device 4 has occurred (90). In the example of FIG. 4, damage module 10 may utilize sensors 8 to detect a presence of smoke inside computing device 4 resulting from the short-circuiting of the internal circuitry. In such instances, damage module 10 may use this data to determine that the hazardous event may be a possible short circuit that causes smoke to be present inside computing device 4.

Responsive to detecting the hazardous event, damage module 10 may utilize sensors 8 to measure a magnitude of a damage measurand associated with the hazardous event to the computing device 4 (92). As described above, damage module 10 may utilize sensors 8 to detect a presence of smoke inside computing device 4 resulting from the internal circuitry of computing device 4 short-circuiting. Responsive to detecting the presence of smoke, sensors 8 may measure the magnitude of the damage measurand as a volume of the smoke within computing device 4. In the example of FIG. 4, sensors 8 may include a light source and a light receiver, where the light received by the light receiver is inversely proportional to the volume of smoke present in computing device 4. In other instances, sensors 8 may comprise either a chemical or a physical carbon dioxide detector.

Damage module 10 may determine whether the magnitude of the damage measurand exceeds a threshold damage value for one or more components of computing device 4 (94). For instance, if sensors 8 detect a presence of smoke, damage module 10 may determine that computing device 4, or a particular component of computing device 4, may be damaged. If computing device 4 were to overheat, experience battery issues, or experience a short circuit, computing device a small amount of smoke may be present. In some examples, this may produce carbon dioxide within computing device 4. As such, in some examples, rather than detecting the actual volume of smoke, sensors 8 may detect smoke by detecting an increased presence of carbon dioxide within computing device 4, such as between 10 and 1,000 parts per million. Computing device 4 may store this volume of carbon dioxide as the threshold damage value in a damage database, where, if sensors 8 detect a volume of carbon dioxide that exceeds this threshold damage value or the presence of smoke, damage module 10 may determine that computing device 4, or the output component, is potentially damaged.

In determining that the magnitude of the damage measurand exceeds the threshold damage value, damage module 10 may first determine the threshold damage value. The threshold damage value may be a predetermined value above which a probability of the hazardous event damaging computing device 4 is greater than a threshold probability of the hazardous event damaging computing device 4. For instance, a user of computing device 4 or the manufacturer of computing device 4 may select a threshold probability, such as 50%, 75%, or 90%, among other probabilities. In such instances, a higher probability may be associated with a higher threshold damage value. In other words, a certain volume of smoke may indicate only a 40% chance of an internal component of computing device 4 being. However, a larger volume of smoke may indicate that there is a larger chance of an internal component of computing device 4 being damaged.

The threshold damage value may be further based on a structural component of computing device 4. For instance, if communication channels 28 are insulated with Teflon, and communication channels 28 were to short-circuit, communication channels 28 may produce a particular volume of smoke. However, if communication channels 28 were insulated with a silicone rubber, and communication channels 28 were to short-circuit, communication channels 28 may produce a larger volume of smoke. Damage module 10 of computing device 4 may actively determine the threshold damage value, or damage database 38 may be pre-loaded by a manufacturer with the respective threshold values of damage.

Damage module 10 may further compare the magnitude of the damage measurand with the threshold damage value, as determined above. Damage module 10 may determine that the magnitude of the damage measurand exceeds the threshold damage value in response to the magnitude of the damage measurand being greater than or equal to the threshold damage value. For instance, if damage module 10 determines that the volume of smoke within computing device 4 exceeds the stored threshold smoke volume, damage module 10 may determine that there is potential damage to computing device 4.

Responsive to determining that the magnitude of the damage measurand exceeds the threshold damage value for the portion, damage module may send, using communication unit 12, a damage message to a central server (96). The damage message may indicate that computing device 4, or a component of computing device 4, is potentially damaged. Continuing the example of FIG. 4, damage module 10 may determine that the magnitude of the damage measurand of the volume of smoke inside computing device 4, as measured by sensors 8, exceeds the threshold damage value that output component may be capable of enduring before the output component is reasonably expected to malfunction. Responsive to making this determination, damage module 10 may notify the central server that computing device 4 (or the output component) is potentially damaged by sending the damage message to the central server. The central server may be owned and operated by a manufacturer of computing device 4 so that the manufacturer is aware of the potential damage to computing device 4.

In some examples, responsive to sending the message to the server device, damage module 10 may receive, via a user account associated with computing device 4, information about repairing the potentially damaged computing device 4. The user account may be an email account, a phone number, a social media account, or any other messaging service that computing device 4 or a separate computing device used by the user may utilize to communicate with the central server. By receiving the repair information through the user account associated with computing device 4, in some examples, the user of computing device 4 may access the repair information on a device separate from computing device 4.

Computing device 4 may or may not actually be damaged upon the occurrence of the hazardous event of detecting smoke or carbon dioxide within computing device 4. Damage module 10 may determine that computing device 4 is potentially damaged based on sensors 8 detecting a presence of smoke or volume of carbon dioxide resulting from the damaging event that meets the threshold damage value. As such, computing device 4 may send the damage message to the central server based only on the potential of computing device 4 being damaged rather than a conclusive determination that computing device 4 is actually damaged.

EXAMPLE 1

A method comprising: detecting, by one or more sensors of a computing device, a hazardous event to the computing device; responsive to detecting the hazardous event, measuring, by the one or more sensors of the computing device, a magnitude of a damage measurand associated with the potentially damaging event; determining, by the computing device, that the magnitude of the damage measurand exceeds a threshold damage value for the computing device; and responsive to determining that the magnitude of the damage measurand exceeds the threshold damage value, sending, by the computing device and to a server device, a message indicating the computing device is potentially damaged.

EXAMPLE 2

The method of example 1, wherein the damage measurand comprises one of a force of impact, a presence of smoke, a volume of carbon dioxide, or a volume of water.

EXAMPLE 3

The method of any of examples 1 or 2, wherein determining that the magnitude of the damage measurand exceeds the threshold damage value comprises: determining, by the computing device and based at least in part on a structural component of the computing device, the threshold damage value, wherein the threshold damage value comprises a predetermined value above which a probability of the hazardous event damaging the computing device is greater than a threshold probability of the hazardous event damaging the computing device; comparing, by the computing device, the magnitude of the damage measurand and the threshold damage value; and determining, by the computing device, that the magnitude of the damage measurand exceeds the threshold damage value in response to the magnitude of the damage measurand being greater than or equal to the threshold damage value.

EXAMPLE 4

The method of example 3, further comprising: responsive to determining that the magnitude of the damage measurand exceeds the threshold damage value, determining, by the computing device, that the structural component of the computing device is potentially damaged.

EXAMPLE 5

The method of example 4, wherein the structural component of the computing device comprises a display component of the computing device or an internal circuitry of the computing device.

EXAMPLE 6

The method of any of examples 1-5, further comprising: determining, by the computing device, a duration of the hazardous event; and adjusting, by the computing device and based at least in part on the duration of the hazardous event, the threshold damage value.

EXAMPLE 7

The method of example 6, wherein adjusting the threshold damage value comprises: determining, by the computing device, that the duration of the hazardous event exceeds a threshold duration; and decreasing, by the computing device, the threshold damage value based at least in part on a difference between the duration of the hazardous event and the threshold duration.

EXAMPLE 8

The method of any of examples 1-7, further comprising: responsive to sending the message to the server device, receiving, via a user account associated with the computing device and from the server device, information about repairing the computing device that is potentially damaged.

EXAMPLE 9

The method of any of examples 1-8, wherein the magnitude of the damage measurand is measured in one of Newtons (N), Joules (J), multiples of an acceleration of gravity (g), volts (V), light intensity (lx), parts per million (PPM), or volume (ml).

EXAMPLE 10

A computing device comprising: one or more sensors configured to: detect a hazardous event to the computing device; and responsive to detecting the hazardous event, measure a magnitude of a damage measurand associated with the potentially damaging event; at least one processor; and at least one non-transitory computer-readable storage medium storing instructions that are executable by the at least one processor to: determine that the magnitude of the damage measurand exceeds a threshold damage value for the computing device; and responsive to determining that the magnitude of the damage measurand exceeds the threshold damage value, send, to a server device, a message indicating the computing device is potentially damaged.

EXAMPLE 11

The computing device of example 10, wherein the damage measurand comprises one of a force of impact, a presence of smoke, a volume of carbon dioxide, or a volume of water.

EXAMPLE 12

The computing device of any of examples 10 or 11, wherein the instructions that are executable by the at least one processor to determine that the magnitude of the damage measurand exceeds the threshold damage value comprise instructions that are executable by the at least one processor to: determine, based at least in part on a structural component of the computing device, the threshold damage value, wherein the threshold damage value comprises a predetermined value above which a probability of the hazardous event damaging the computing device is greater than a threshold probability of the hazardous event damaging the computing device; compare the magnitude of the damage measurand and the threshold damage value; and determine that the magnitude of the damage measurand exceeds the threshold damage value in response to the magnitude of the damage measurand being greater than or equal to the threshold damage value.

EXAMPLE 13

The computing device of example 12, wherein the instructions are further executable by the at least one processor to: responsive to determining that the magnitude of the damage measurand exceeds the threshold damage value, determine that the structural component of the computing device is potentially damaged.

EXAMPLE 14

The computing device of any of examples 10-13, wherein the instructions are further executable by the at least one processor to: responsive to sending the message to the server device, receive, via a user account associated with the computing device and from the server device, information about repairing the computing device that is potentially damaged.

EXAMPLE 15

The computing device of any of examples 10-14, wherein the instructions are further executable by the at least one processor to: determine a duration of the hazardous event; and adjust, based at least in part on the duration of the hazardous event, the threshold damage value.

EXAMPLE 16

The computing device of example 15, wherein the instructions that are executable by the at least one processor to adjust the threshold damage value comprise instructions that are executable by the at least one processor to: determine that the duration of the hazardous event exceeds a threshold duration; and decrease the threshold damage value based at least in part on a difference between the duration of the hazardous event and the threshold duration.

EXAMPLE 17

A non-transitory computer-readable storage medium encoded with instructions that, when executed, cause at least one processor of a computing device to: detect, using one or more sensors of the computing device, a hazardous event to the computing device; responsive to detecting the hazardous event, measure, using the one or more sensors of the computing device, a magnitude of a damage measurand associated with the potentially damaging event; determine that the magnitude of the damage measurand exceeds a threshold damage value for the computing device; and responsive to determining that the magnitude of the damage measurand exceeds the threshold damage value, send, to a server device, a message indicating the computing device is potentially damaged.

EXAMPLE 18

The non-transitory computer-readable storage medium of example 17, wherein the instructions that cause the at least one processor to determine that the magnitude of the damage measurand exceeds the threshold damage value comprise instructions that, when executed, cause the at least one processor to: determine, based at least in part on a structural component of the computing device, the threshold damage value, wherein the threshold damage value comprises a predetermined value above which a probability of the hazardous event damaging the computing device is greater than a threshold probability of the hazardous event damaging the computing device; compare the magnitude of the damage measurand and the threshold damage value; and determine that the magnitude of the damage measurand exceeds the threshold damage value in response to the magnitude of the damage measurand being greater than or equal to the threshold damage value.

EXAMPLE 19

The non-transitory computer-readable storage medium of any of examples 17 or 18, wherein the instructions, when executed, further cause the at least one processor to: responsive to sending the message to the server device, receive, via a user account associated with the computing device and from the server device, information about repairing the computing device that is potentially damaged.

EXAMPLE 20

The non-transitory computer-readable storage medium of any of examples 17-19, wherein the instructions, when executed, further cause the at least one processor to: determine a duration of the hazardous event; and adjust, based at least in part on the duration of the hazardous event, the threshold damage value, wherein the instructions that cause the at least one processor to adjust the threshold damage value comprise instructions that, when executed, further cause the at least one processor to: determine that the duration of the hazardous event exceeds a threshold duration; and decrease the threshold damage value based at least in part on a difference between the duration of the hazardous event and the threshold duration.

EXAMPLE 21

A device comprising means for performing the method of any combination of examples 1-7.

EXAMPLE 22

A computer-readable storage medium encoded with instructions that, when executed, cause at least one processor of a computing device to perform the method of any combination of examples 1-7.

EXAMPLE 23

A device comprising at least one module operable by one or more processors to perform the method of any combination of examples 1-7.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A method comprising:
    detecting, by one or more sensors of a computing device, a hazardous event to the computing device;
    responsive to detecting the hazardous event, measuring, by the one or more sensors of the computing device, a magnitude of a damage measurand associated with the potentially damaging event, wherein the damage measurand comprises a presence of smoke, a concentration of carbon dioxide, or a volume of water;
    determining, by the computing device, a duration of the hazardous event;
    adjusting, by the computing device and based at least in part on the duration of the hazardous event, a threshold damage value for the computing device;
    after adjusting the threshold damage value for the computing device based at least in part on the duration of the hazardous event, determining, by the computing device, that the magnitude of the damage measurand exceeds the threshold damage value for the computing device; and
    responsive to determining that the magnitude of the damage measurand exceeds the threshold damage value, sending, by the computing device and to a server device, a message indicating the computing device is potentially damaged.

2. The method of claim 1, wherein determining that the magnitude of the damage measurand exceeds the threshold damage value comprises:
    determining, by the computing device and based at least in part on a structural component of the computing device, the threshold damage value, wherein the threshold damage value comprises a predetermined value above which a probability of the hazardous event damaging the computing device is greater than a threshold probability of the hazardous event damaging the computing device;
    comparing, by the computing device, the magnitude of the damage measurand and the threshold damage value; and
    determining, by the computing device, that the magnitude of the damage measurand exceeds the threshold damage value in response to the magnitude of the damage measurand being greater than or equal to the threshold damage value.

3. The method of claim 2, further comprising:
    responsive to determining that the magnitude of the damage measurand exceeds the threshold damage value, determining, by the computing device, that the structural component of the computing device is potentially damaged.

4. The method of claim 3, wherein the structural component of the computing device comprises a display component of the computing device or an internal circuitry of the computing device.

5. The method of claim 1, wherein adjusting the threshold damage value comprises:
    determining, by the computing device, that the duration of the hazardous event exceeds a threshold duration; and
    decreasing, by the computing device, the threshold damage value based at least in part on a difference between the duration of the hazardous event and the threshold duration.

6. The method of claim 1, further comprising:
    responsive to sending the message to the server device, receiving, via a user account associated with the computing device and from the server device, information about repairing the computing device that is potentially damaged.

7. The method of claim 1, wherein the magnitude of the damage measurand is measured in one of volts (V), light intensity (lx), parts per million (PPM), or volume (ml).

8. A computing device comprising:
    one or more sensors configured to:
        detect a hazardous event to the computing device; and
        responsive to detecting the hazardous event, measure a magnitude of a damage measurand associated with the potentially damaging event;
    at least one processor, wherein the damage measurand comprises a presence of smoke, a concentration of carbon dioxide, or a volume of water; and
    at least one non-transitory computer-readable storage medium storing instructions that are executable by the at least one processor to:
        determine a duration of the hazardous event
        adjust, based at least in part on the duration of the hazardous event, a threshold damage value for the computing device;
        after adjusting the threshold damage value for the computing device based at least in part on the duration of the hazardous event, determine that the magnitude of the damage measurand exceeds the threshold damage value for the computing device; and
        responsive to determining that the magnitude of the damage measurand exceeds the threshold damage value, send, to a server device, a message indicating the computing device is potentially damaged.

9. The computing device of claim 8, wherein the instructions that are executable by the at least one processor to determine that the magnitude of the damage measurand exceeds the threshold damage value comprise instructions that are executable by the at least one processor to:

determine, based at least in part on a structural component of the computing device, the threshold damage value, wherein the threshold damage value comprises a predetermined value above which a probability of the hazardous event damaging the computing device is greater than a threshold probability of the hazardous event damaging the computing device;

compare the magnitude of the damage measurand and the threshold damage value; and determine that the magnitude of the damage measurand exceeds the threshold damage value in response to the magnitude of the damage measurand being greater than or equal to the threshold damage value.

10. The computing device of claim 9, wherein the instructions are further executable by the at least one processor to:

responsive to determining that the magnitude of the damage measurand exceeds the threshold damage value, determine that the structural component of the computing device is potentially damaged.

11. The computing device of claim 8, wherein the instructions are further executable by the at least one processor to:

responsive to sending the message to the server device, receive, via a user account associated with the computing device and from the server device, information about repairing the computing device that is potentially damaged.

12. The computing device of claim 8, wherein the instructions that are executable by the at least one processor to adjust the threshold damage value comprise instructions that are executable by the at least one processor to:

determine that the duration of the hazardous event exceeds a threshold duration; and decrease the threshold damage value based at least in part on a difference between the duration of the hazardous event and the threshold duration.

13. A non-transitory computer-readable storage medium encoded with instructions that, when executed, cause at least one processor of a computing device to:

detect, using one or more sensors of the computing device, a hazardous event to the computing device;

responsive to detecting the hazardous event, measure, using the one or more sensors of the computing device, a magnitude of a damage measurand associated with the potentially damaging event, wherein the damage measurand comprises a presence of smoke, a concentration of carbon dioxide, or a volume of water;

determine a duration of the hazardous event;

adjust, based at least in part on the duration of the hazardous event, a threshold damage value for the computing device;

after adjusting the threshold damage value for the computing device based at least in part on the duration of the hazardous event, determine that the magnitude of the damage measurand exceeds the threshold damage value for the computing device; and responsive to determining that the magnitude of the damage measurand exceeds the threshold damage value, send, to a server device, a message indicating the computing device is potentially damaged.

14. The non-transitory computer-readable storage medium of claim 13, wherein the instructions that cause the at least one processor to determine that the magnitude of the damage measurand exceeds the threshold damage value comprise instructions that, when executed, cause the at least one processor to:

determine, based at least in part on a structural component of the computing device, the threshold damage value, wherein the threshold damage value comprises a predetermined value above which a probability of the hazardous event damaging the computing device is greater than a threshold probability of the hazardous event damaging the computing device;

compare the magnitude of the damage measurand and the threshold damage value; and determine that the magnitude of the damage measurand exceeds the threshold damage value in response to the magnitude of the damage measurand being greater than or equal to the threshold damage value.

15. The non-transitory computer-readable storage medium of claim 13, wherein the instructions, when executed, further cause the at least one processor to:

responsive to sending the message to the server device, receive, via a user account associated with the computing device and from the server device, information about repairing the computing device that is potentially damaged.

16. The non-transitory computer-readable storage medium of claim 13, wherein the instructions that cause the at least one processor to adjust the threshold damage value comprise instructions that, when executed, further cause the at least one processor to:

determine that the duration of the hazardous event exceeds a threshold duration; and decrease the threshold damage value based at least in part on a difference between the duration of the hazardous event and the threshold duration.

* * * * *